(12) United States Patent
Utsunomiya et al.

(10) Patent No.: US 6,327,127 B1
(45) Date of Patent: Dec. 4, 2001

(54) ELECTRONIC INSTRUMENT

(75) Inventors: Fumiyasu Utsunomiya; Yoshifumi Yoshida, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/235,675

(22) Filed: Jan. 22, 1999

(30) Foreign Application Priority Data

| Jan. 28, 1998 | (JP) | 10-15395 |
| Feb. 9, 1998 | (JP) | 10-27092 |
| Dec. 22, 1998 | (JP) | 10-353087 |

(51) Int. Cl.$^7$ ................................................ H02H 3/247
(52) U.S. Cl. ................................ 361/92; 307/87; 307/130
(58) Field of Search .................. 361/86, 88, 92; 307/87, 38, 39, 103, 116, 125, 130; 368/66, 156, 157, 159, 203, 204, 327

(56) References Cited

U.S. PATENT DOCUMENTS

| 4,439,805 | 3/1984 | Tarleton | 361/92 |
| 5,357,395 | 10/1994 | Bissell et al. | 361/92 |
| 5,684,384 | 11/1997 | Barkat et al. | 320/6 |
| 5,715,465 | 2/1998 | Savage et al. | 395/750 |
| 5,778,238 | * 7/1998 | Hofhine | 327/143 |
| 5,798,985 | * 8/1998 | Nakajima | 368/64 |

FOREIGN PATENT DOCUMENTS

| 0392017 | 10/1990 | (EP) | H02M/3/28 |
| 0518039 | 12/1992 | (EP) | G06F/1/28 |

* cited by examiner

*Primary Examiner*—Ronald W. Leja
(74) *Attorney, Agent, or Firm*—Adams & Wilks

(57) ABSTRACT

An electronic instrument in which erroneous operation after power is applied thereto even in the case where a power source voltage is not quickly raised. Power is generated by a power source such as a thermoelectric conversion device and stored in a secondary battery or charge storage device through a optional boosting circuit. A control circuit and a main circuit are supplied with the power. However, the control circuit has a lower minimum operating voltage than the main circuit. Thus, with the increase in level of the power source voltage, the control circuit starts to operate before the main circuit and outputs a control signal to prevent the main circuit from operating in such a manner that a through current is prevented and the main circuit is prevented from drawing appreciable current from the power source circuit, which would prevent the voltage of the secondary battery or the charge storage device from increasing. When the power source voltage is increased to a voltage level at which the main circuit can operate in a stable manner, the control circuit enables operation of the main circuit.

22 Claims, 5 Drawing Sheets

ELECTRONIC INSTRUMENT

BACKGROUND OF THE INVENTION

The present invention relates to a variety of electronic instruments, such as electronic watches, portable communication instruments, or electric home appliances, and particularly to preventing an erroneous operation from occurring when the voltage of a power source circuit of a low power consumption instrument has been lowered.

Hitherto, in electronic watches, portable communication instruments, and other various electronic instruments, as signals come to be digitally processed, a frequency-dividing circuit, a central processing unit (CPU), a flip-flop circuit, or the like has been used.

FIG. 9 is a block diagram of a conventional electronic instrument. In FIG. 9, a power source circuit 901 is made up of a thermoelectric conversion element 902 as an electric power generating means, and a rectifying circuit 903 for preventing countercurrent. Electric power generated by the thermoelectric conversion element 902 is stored in a storage means 904 through the rectifying circuit 903. A load circuit 905 made up of a MOS transistor, a bipolar transistor, and the like operates using the generated electric power or stored electric power as a power source. For example, in the case where the electronic instrument is a clock system of an electric watch, this load circuit is made up of an oscillating circuit, a frequency-dividing circuit for frequency dividing an output signal of the oscillating circuit, a time display means for displaying a time on the basis of an output signal of the frequency-dividing circuit, and the like.

In such a conventional electronic instrument, for the purpose of making the electronic instrument miniaturized and lightweight, the power source circuit 901 is also required to be made miniaturized and lightweight, and with this, there is a tendency that the power supply capability of the power source circuit 901 is decreased. On the other hand, by virtue of need of prolonging the operation time of the electronic instrument, the storage means 904 is forced to have its capacity made large. These are noticeable especially in a portable electronic instrument such as an electronic watch or a portable telephone.

In such a case, when the storage means 904 is charged, from a non-charged state, with electric power supplied from the power source circuit 901, the power source voltage to the load circuit 905 is not quickly raised, but a long time is required until the power source voltage is increased up to a voltage at which the load circuit 905 operates normally. Thus, a period of time when the power source voltage remains in the vicinity of an operation start voltage at which the operation of the load circuit 905 becomes unstable, becomes long. Accordingly, there have been problems in that not only does the start of operation of the load circuit 905 become delayed, but also the load circuit 905 can perform an erroneous operation.

In order to prevent this erroneous operation, there is generally used a method in which a power on clear circuit is used, which detects the quick increase of voltage at the start of power supply and outputs a clear signal, and with the start of power supply, the clear signal is supplied to a frequency-dividing circuit, a CPU, and the like to reset them into a predetermined initial state, and then, a normal operation is started.

However, even if the power on clear circuit is used, the power source voltage is not quickly raised because of the foregoing reason, so that a sufficient clear signal can not be generated and it has been difficult to solve the erroneous operation of the load circuit 905.

Besides, in the case where the load circuit is a clock system, a MOS transistor having large driving capability is used in the load circuit to the power source in order to drive a stepping motor. Thus, when the power source voltage of the load circuit enters into a voltage range where the operation of the circuit is unstable, a large current flows by a through current. In this case, the electric power supplied from the power source circuit 901 is consumed by the above through current, so that there is a case where the storage means 904 can not be charged. When the through current flows once, the power source voltage does not become larger than a voltage at which the through current of the stepping motor driving MOS transistor balances with the power supply capability of the power source circuit 901. Thus, there has been a problem in that if the balancing voltage is less than an operation voltage of the load circuit 905, the load circuit 905 does not start a normal operation for a long time.

Besides, some load circuits 905 have such a mechanism that when a power source voltage is low, more current flowns. In this case, when the power source circuit 901 starts to supply electric power, the voltage of the storage means 904 is gradually increased, so that more current flowns when the voltage is low. Thus, there has been a problem in that voltage drop occurs and the voltage is not increased.

Further, even in an electronic instrument which does not include an electric power generating means and a large capacity storage means as described above, in such a case that a relatively large smoothing capacitor is used to stabilize the power source voltage, quick rising of the power can not be obtained. Thus, there has been a problem that a sufficient clear signal can not be obtained by the foregoing power on clear circuit, so that an erroneous operation occurs.

SUMMARY OF THE INVENTION

It is an object of the present invention to provide an electronic instrument which can prevent an erroneous operation immediately after feeding even in the case where a power source voltage is not quickly raised. Another object of the present invention is to prevent such a case that in an electronic instrument including electric power generating means and storage means, a large current flows through a load circuit at a halfway power source voltage so that the power source voltage can not be increased.

An electronic instrument of the present invention includes an electronic instrument main body circuit, a control circuit capable of operating at a threshold voltage lower than that of the electronic instrument main body circuit, and a power source circuit for feeding the electronic instrument main body circuit and the control circuit, and is characterized in that the control circuit outputs a control signal to stop the operation of the electronic instrument main body circuit until the feeding voltage from the power source circuit to the electronic instrument main body circuit becomes a minimum operation voltage at which electronic instrument main body circuit normally operates. When the power source circuit start to feed, the control circuit having the low threshold voltage first starts to operate with the increase of the power source voltage, and outputs the control signal to stop the operation of the electronic instrument main body circuit. When the power source voltage is further increased and becomes the voltage at which the electronic instrument main body circuit can normally operate, the control circuit operates the electronic instrument main body circuit through the control signal. By this, an erroneous operation of the electronic instrument is prevented.

The power source circuit may be made up of electric power generating means for generating electric power and storage means for storing the electric power generated in the electric power generating means. It is preferable to use a thermoelectric conversion element as the electric power generating means in view of miniaturization.

Moreover, when a boosting circuit for boosting the output voltage of the thermoelectric conversion element to charge the storage means is provided, the performance of the whole charging system is improved.

In the case where the electronic instrument main body circuit includes an electric element having high driving capability to the power source, the electric element is maintained in an off state by the control signal until the feeding voltage from the power source circuit becomes the voltage at which the electronic instrument main body circuit normally operates, so that it is possible to prevent such a case that the power source voltage is not increased since a through current flows across the power source by an unstable operation of the electronic instrument main body circuit. As the electronic instrument main body circuit, a clock system having a clocking function may be used. Moreover, an erroneous operation can be prevented by controlling a motor driving MOS transistor, as the electric element, or resetting a frequency-dividing circuit in a previous stage.

In addition to the above structure, an erroneous operation can also be prevented by a structure comprising a power source circuit, a rectifying circuit for preventing countercurrent of electric power to the power source circuit, storage means for storing electric power of the power source circuit, an electronic instrument main body circuit operated by electric power of the power source circuit, and a control circuit which is disposed between the storage means and the electronic instrument main body circuit, supplies electric power to the electronic instrument main body circuit when the voltage value of the storage means reaches a predetermined voltage value near a minimum operation voltage of the electronic instrument main body circuit, and stops electric power supply to the electronic instrument main body circuit when the voltage value is not higher than the predetermined voltage value.

In this structure of the electronic instrument, the initial object can be achieved by using, as the control circuit, a reference voltage generating circuit for generating a reference voltage equal to the predetermined voltage value, a comparison circuit for comparing the reference voltage with an input voltage of the control circuit, and a one-conductivity type MOS transistor, the source and drain of which are respectively connected to the input terminal and output terminal of the control circuit and which carries out switching with an output signal of the comparison circuit applied to its gate.

By this, a voltage supplied to the electronic instrument main body circuit is increased at one stroke, so that a through current does not flow, and when the power source circuit starts to supply electric power, the electronic instrument main body circuit can immediately start to operate. Since the power loss due to the through current can be decreased, the electronic instrument having a high power efficiency can be obtained.

Moreover, since the control circuit has the structure comprising the reference voltage generating circuit, the comparison circuit, and the MOS transistor, when the reference voltage generated by the reference voltage generating circuit is changed, the MOS transistor can be switched at an arbitrary voltage. Thus, it is possible to optimize the prevention of erroneous operation when electric power supply to the electronic instrument main body circuit is started.

Moreover, in the electronic instrument having the above described structure, the control circuit may further comprise a detection circuit for detecting an input voltage of the control circuit, a timer circuit for holding an output signal of the detection circuit for a predetermined period of time to continue outputting to a switch circuit, and the switch circuit for carrying out switching by receiving an output signal of the timer circuit.

In this circuit, since the control circuit is made up of the detection circuit, the timer circuit, and the switch circuit, it is possible to prevent such a case that the switch circuit is connected and voltage of a capacitor is quickly lowered so that the detection circuit makes an erroneous detection.

DETAILED DESCRIPTION OF THE PREFERRED EMBODIMENTS

Figure 1:
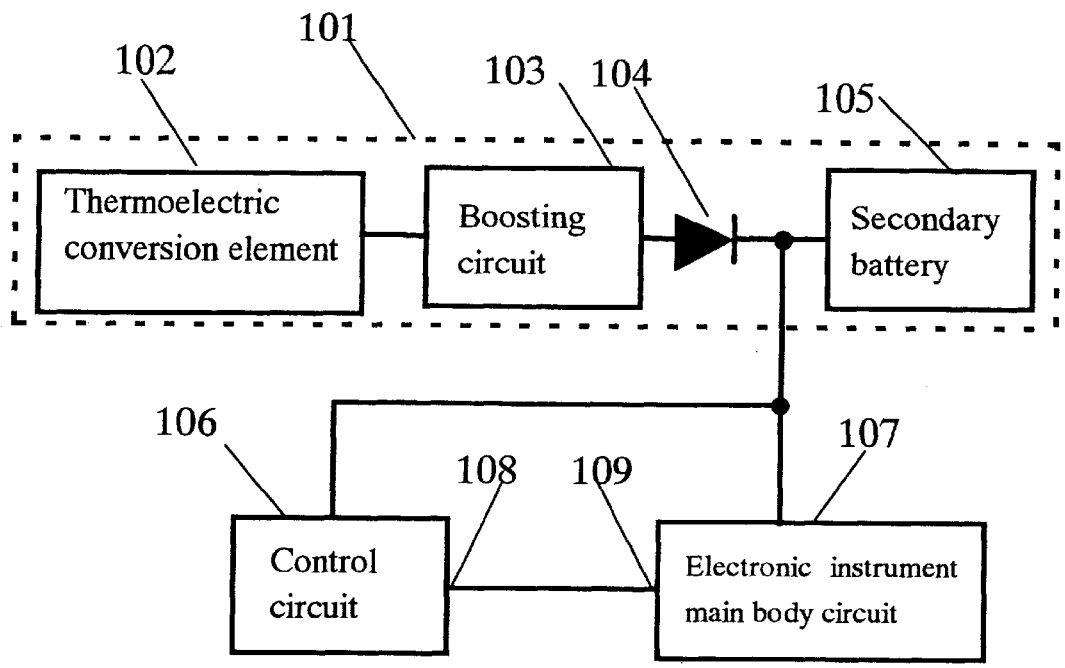
FIG. 1 is a block diagram of an electronic instrument of an embodiment of the present invention.

FIG. 1 is a block diagram of an electronic instrument according to an embodiment of the present invention, and shows an example of an electronic watch using heat generating energy by a thermoelectric conversion element. In FIG. 1, a power source circuit 101 is made up of a thermoelectric conversion element 102, a boosting circuit 103, a diode 104, and a secondary battery 105.

The thermoelectric conversion element 102 is constructed, for example, such that P-type thermoelectric material elements and N-type thermoelectric material elements are placed between two substrates and the P-type thermoelectric material elements and N-type thermoelectric material elements are PN connected on the substrates through conductive materials, such as metals, and the plurality of elements are connected in series to each other such as P, N, P, N, P, N, . . . .

When a temperature difference exist between both the substrates, an electromotive force of a voltage corresponding to the temperature difference is generated. The thermoelectric conversion element is constructed such that an electromotive force of a high voltage can be obtained by increasing the number of PN connections. The output voltage of the thermoelectric conversion element is gradually increased by thermal capacity, internal resistance, and the like.

As an output voltage of this thermoelectric conversion element, for the purpose of obtaining a voltage of approximately 1.5 V at which a clock can operate, approximately ten thousand thermoelectric material elements are required. However, due to the restriction of space in the inside of an electronic watch, there is a limit in an obtained voltage. Thus, the obtained voltage is increased by using the boosting circuit 103 up to a voltage at which a clock can operate, and then, the power is supplied to the clock. As the boosting circuit 103, the following systems are suitable in view of miniaturization: a switched capacitor system in which a plurality of capacitors in the state of parallel connection are charged and the respective capacitors are changed into a series connection by switching elements to generate a boosted voltage, and this operation is repeated; and a system in which a current flowing through a coil is turned on and off by a switching element so that boosting is performed by using a generated self-induction current of the coil.

The voltage boosted by the boosting circuit 103 is stored in the secondary battery 105 constituted by a lithium secondary battery and the like through the diode 104 for preventing countercurrent. The diode 104 prevents such a case that when temperature difference is not given to the thermoelectric conversion element 102 and power generation is stopped, electric power is reversely flown from the secondary battery 105 to the boosting circuit 103 so that energy is consumed wastefully. A diode, such as a Schottky barrier diode, having a small voltage drop is preferable as the diode 104. The secondary battery 105 is provided to supply energy and to maintain clock operation when power generation of the thermoelectric conversion element 102 is stopped so that energy is not supplied from the boosting circuit 103.

The output of the power source circuit 101 is taken out of a secondary battery connection point and is sent to a control circuit 106, and at the same time, is supplied to an electronic instrument main body circuit 107. Here, the electronic instrument main body circuit 107 is a clock system, and its details will be described later.

On the other hand, an output terminal 108 of the control circuit 106 is connected to a control input terminal 109 of the electronic instrument main body circuit 107. The control circuit 106 outputs a control signal to control the operation of the electronic instrument main body circuit 107. That is, by the control signal, the control circuit 106 resets the electronic instrument main body circuit 107 and keeps the electronic instrument main body circuit in an operation stop state when the power source voltage is not higher than a predetermined value, and makes the electronic instrument main body circuit 107 operate when the power source voltage is increased up to a value not lower than the predetermined value.

The electronic instrument main body circuit 107 is constructed such that in response to the control signal having been sent before the power source voltage reaches a voltage at which the electronic instrument main body circuit can operate, a stepping motor driving MOS transistor is turned off to be placed in a operation stop state, so that the electronic instrument main body circuit 107 itself does not unstably operate. When the power source voltage is increased up to the voltage at which the electronic instrument main body circuit 107 can normally operate, the electronic instrument main body circuit 107 starts a normal operation in response to the control signal.

Since the control circuit 106 is constructed such that it operates at a threshold voltage lower than that of the electronic instrument main body circuit 107, the control circuit can certainly keep the operation stop state even in a voltage range in which the electronic instrument main body circuit 107 shows unstable behavior.

When the electric watch incorporating the circuits as described above is worn on a wrist, the thermoelectric conversion element 102 generates electric power by, for example, the temperature difference between a body temperature and an outer temperature, and after the output voltage is boosted by the boosting circuit 103, the boosted voltage is supplied through the diode 104 to the secondary battery 105 which has not been charged, and charging starts. At the same time, feeding to the control circuit 106 and the electronic instrument main body circuit 107 is started. The power source voltage fed to the control circuit 106 and the electronic instrument main body circuit 107 is not quickly raised through inner impedance of the boosting circuit 103, capacity of the secondary battery 105, and the like, but is gradually raised. When this power source voltage reaches the threshold voltage at which the control circuit 106 operates, which is less than a minimum operation voltage of the electronic instrument main body circuit 107, the control circuit 106 outputs a high control signal from the output terminal 108 to the control input terminal 109 of the electronic instrument main body circuit 107. By this, the stepping motor driving MOS transistor of the electronic instrument main body circuit 107 is maintained in the off state and the operation is forcibly stopped, so that it is prevented that a large through current flows across the power source.

When the power source voltage is further increased up to a voltage at which the electronic instrument main body circuit 107 can normally operate, the control circuit 106 detects this, and outputs a low control signal from the output terminal 108 to the control input terminal 109. In response to this, the foregoing operation stop state is released and the electronic instrument main body circuit 107 starts the normal operation.

Next, the cause of erroneous operation will be described in more detail. The stepping motor driving MOS transistor is constructed such that two pairs of an N-type MOS transistor and a P-type MOS transistor connected in series to each other are connected in parallel to the power source, and the stepping motor is connected to a point between the series connections.

Normally, both an N-type MOS transistor and a P-type MOS transistor series connected to each other are not turned on at the same time, but a through current flows only at an instant when stepping motor current is switched. However, the operation becomes unstable by noise and the like at a halfway power source voltage, and there is a case where a relatively large leak current flows through both the series connected N-type MOS transistor and the P-type MOS transistor. These MOS transistors have high current driving capability, and the leak current caused by such erroneous operation can not be neglected. In the case where the current supply capability of the power source circuit 101 is small, the power source voltage can not be increased through the leak current, and a normal operation can not be achieved.

Besides, when the clock system starts an operation once and the stepping motor is driven, a relatively large current flows, and the power source voltage is lowered by this. Thus, there is also a case that the operation is stopped in the state where current flows through the motor, and the voltage can not be raised. Especially, in the case where a system is used wherein in order to decrease the consumed power of the motor, the rotation of the motor is detected and the width of a drive pulse is made variable in accordance with motor load, when the rotation can not be detected, the motor is again driven by a long pulse with sufficient driving force to increase rotation force. In the state where the power source voltage is low, there is an increased possibility that it can not be rotated, and with this, the motor is driven by a long pulse and current consumption is increased, so that the foregoing erroneous operation comes to be likely to occur.

Figure 2:
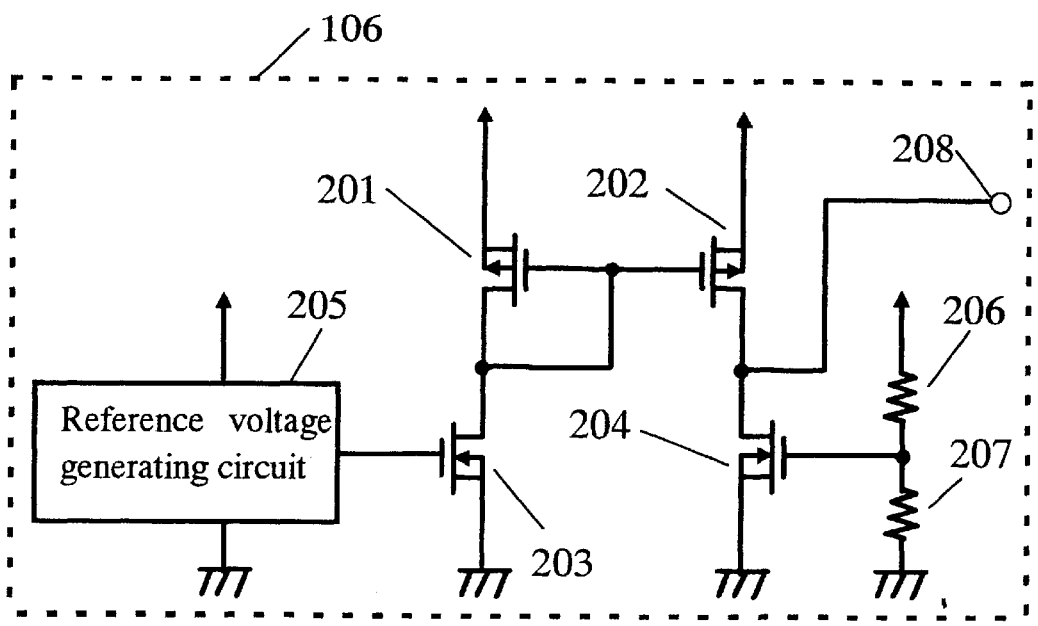
FIG. 2 is a circuit diagram of a control circuit used in the embodiment of FIG. 1.

FIG. 2 is a circuit diagram showing the details of the control circuit 106 shown in FIG. 1. Here, although the case of a P-substrate N-well process will be described, since the same thing can be said of the case of an N-substrate P-well process, and an explanation thereof be omitted.

As shown in FIG. 2, the control circuit 106 is made up of a current mirror type comparator composed of P-channel MOS transistors 201 and 202 and N-channel MOS transistors 203 and 204, a reference voltage generating circuit 205 for outputting a predetermined reference voltage, and voltage dividing resistors 206 and 207.

When the reference voltage from the reference voltage generating circuit 205 is applied to a gate of the N-channel MOS transistor 203, the N-channel MOS transistor 203 is turned on. By this, current flows through the P-channel MOS transistor 201 and the N-channel MOS transistor 203, and the P-channel MOS transistor 202 is turned on to the same degree as the P-channel MOS transistor 201. On the other hand, a divided voltage obtained from the power source voltage by the resistors 206 and 207 is applied to a gate of the N-channel MOS transistor 204, and the N-channel MOS transistor 204 is in an on state in response to this voltage. Then, a voltage divided through the degree of the on state of the P-channel MOS transistor 202 and the degree of the on state of the N-channel MOS transistor 204 is obtained from an output terminal 208. Thus, in the case where the power source voltage is lower than a predetermined voltage set with the reference voltage, a high control signal is output, while in the case where the power source voltage is higher than the predetermined voltage, a low control signal is output from the output terminal 208.

As an example, in the case where the operation voltage of the electronic instrument main body circuit 107 is set at 1.5 V, with respect to the threshold voltage of the MOS transistors constituting the respective circuits of the electronic instrument main body circuit 107, since the threshold voltage of the P-channel MOS transistor is about −0.7 V, and the threshold voltage of the N-channel MOS transistor is about 0.7 V, the voltage at which the electronic instrument main body circuit 107 unstably operates is a voltage of approximately 0.7 V.

If the threshold voltage of the P-channel MOS transistors 201 and 202 is made about −0.4 V, the threshold voltage of the N-channel MOS transistors 203 and 204 is made about 0.4 V, and the reference voltage of the reference voltage generating circuit 205 is made 0.4 V, then the control circuit 106 can operate from about 0.5 V. Thus, the control signal can be stably output at a voltage lower than the voltage at which the electronic instrument main body circuit 107 unstably operates.

In the foregoing example, the voltage at which the electronic instrument main body circuit 107 stably operates is about 1.0 V or more, and when the power source voltage of the electronic instrument main body circuit 107 is 1.0 V, it is appropriate that a divided voltage through the voltage dividing resistors 206, 207 for dividing the voltage becomes 0.4 V. That is, in this case, when the power source voltage of the electronic instrument main body circuit 107 is less than 1.0 V, a high control signal can be output from the control circuit 106, and when the power source voltage is not less than 1.0 V, a low control signal can be outputted.

Incidentally, by making the control circuit 106 operate intermittently, it is possible to make power consumption low.

Figure 3:
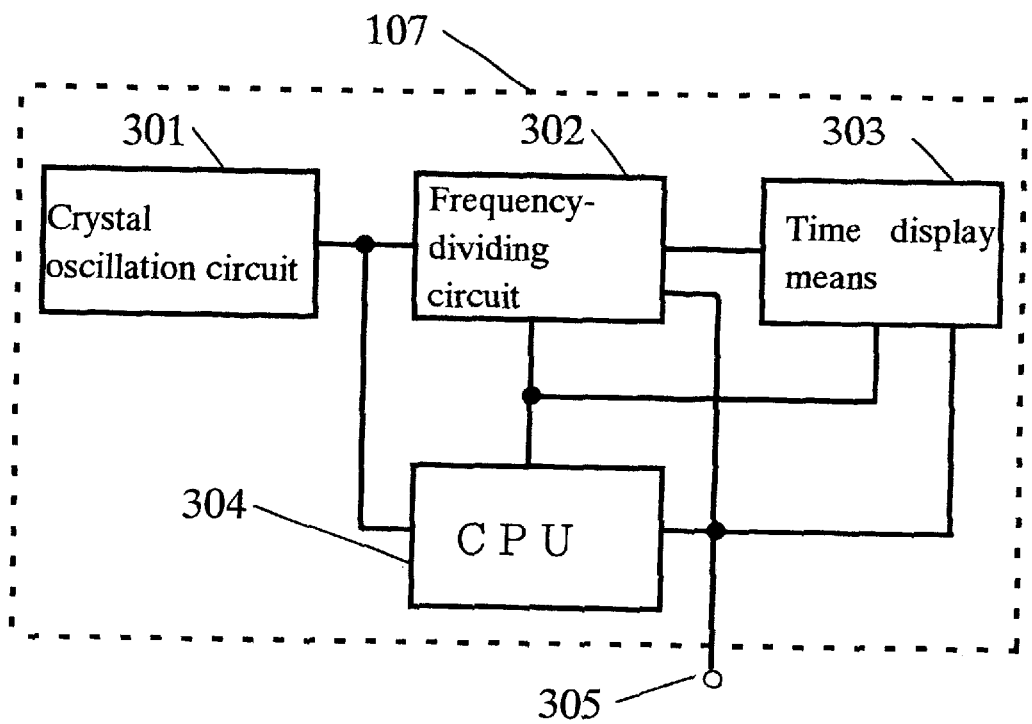
FIG. 3 is a block diagram of an electronic instrument main body circuit used in the embodiment of FIG. 1.

Next, with reference to FIG. 3, the clock system of the electronic instrument main body circuit 107 will be described. After an output signal of a crystal oscillation circuit 301 is frequency-divided by a frequency-dividing circuit 302, the signal is outputted to a time display means 303, and time is displayed. On the other hand, a CPU 304 uses the output of the oscillation circuit 301 as a clock, and controls the frequency-dividing circuit 302 and the time display means 303, so that a stopwatch function, an alarm function, a timer function, a time correction function, or the like is realized and the result is displayed. A signal at a control input terminal 305 of the electronic instrument main body circuit 107 is connected to reset terminals of the frequency-dividing circuit 302, the CPU 304, and the time display means 303.

Although not shown, in the case of an analog electric watch, the time display means 303 is provided with a stepping motor driving MOS transistor to the power source, which has high driving capability, that is, flows a large current at a normal operation.

In the electronic instrument main body circuit 107 constructed as described above, while a high control signal is supplied to the control input terminal 305 from the control circuit 106, the frequency-dividing circuit 302 and the CPU 304 are reset and are maintained in a stop state. With respect to the stepping motor driving MOS transistor included in the time display means 303, an off state is maintained in response to the high control signal.

On the other hand, when a low control signal is supplied to the control input terminal 305, the frequency-dividing circuit 302 and the CPU 304 start a normal operation. Besides, the stepping motor driving MOS transistor is also released from the off state in response to the low control signal and starts a normal operation. By this, the electronic instrument main body circuit 107 does not make an erroneous operation but can make a normal operation.

As described above, according to this embodiment, even in the case where the power source voltage is not quickly raised, the occurrence of erroneous operation can be prevented. This embodiment is particularly effective in the case where the power source voltage remains for a long time in the vicinity of an operation voltage at which the operation of the electronic instrument main body circuit 107 becomes unstable. Thus, it becomes possible to use the small thermoelectric conversion element 102 and the large capacity secondary battery 105, and it is possible to provide an electric watch which is small and can operate for a long time.

In the case where an attempt is made to effectively use even a small power generator by using the boosting circuit 103 since the output voltage is low because of a low temperature difference applied to the thermoelectric conversion element 102, there is a case where the rise of a power source voltage becomes very gentle since a charging current is small. However, an erroneous operation can be effectively prevented even in this case.

Particularly, in the case where the electronic instrument main body circuit 107 includes an electric element having high driving capability, such as a stepping motor driving MOS transistor, it is possible to prevent a fatal erroneous operation in which the electronic instrument main body circuit 107 can not be operated since the electric element is turned on by an erroneous operation so that the power source voltage of the electronic instrument main body circuit 107 is not increased by charging.

In this embodiment, the frequency-dividing circuit 302 and the CPU are reset by the control signal to be kept in the operation stop state, and the stepping motor driving MOS transistor is turned off to be kept in the operation stop state. However, it is also possible to keep either one or two of them in the operation stop state according to the circuit structure. For example, it is easy to reset only the frequency-dividing circuit 302. Also in this case, the operation of the stepping motor driving MOS transistor at a later stage is stopped, and the frequency-dividing circuit 302 does not output a pulse. Thus, it is possible to eliminate noise from being sent to a later stage, and a possibility of erroneous operation becomes extremely low even in a power source voltage region where there is a danger of erroneous operation.

Figure 4:
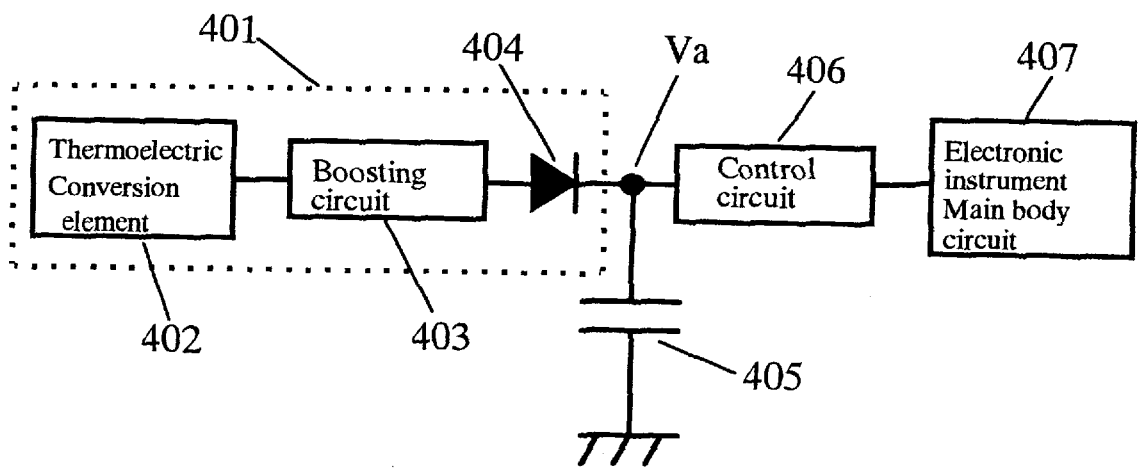
FIG. 4 is a block diagram of an electronic instrument of another embodiment of the present invention.

FIG. 4 is a block diagram showing another embodiment of an electronic instrument using the present invention. In FIG. 4, the 5:electronic instrument is made up of a power source circuit 401 constituted by a thermoelectric conversion element 402, a boosting circuit 403, and a Schottky diode 404 as a rectifying element, a capacitor 405 as a storage means, a control circuit 406, and an electronic instrument main body circuit 407.

Since the thermoelectric conversion element 402, the boosting circuit 403, and the diode 404 are the same as those shown in FIG. 1, a detailed description will be omitted.

The capacitor 405 is charged by the power source circuit 401, the charged power is supplied to the electronic instrument main body circuit 407 (here, wrist watch system) through the control circuit 406, and the electronic instrument main body circuit 407 is operated. It is desirable that the capacitance of the capacitor 405 is not less than twice the whole capacitance of the electronic instrument main body circuit 407 seen from a power source input terminal. In the following, the description will be made under the assumption that a voltage value of the capacitor 405 is Va.

In the case where the voltage Va of the capacitor 405 becomes equal to or higher than a predetermined voltage value Vt set at a value not lower than a minimum operation voltage of the electronic instrument main body circuit 407, the control circuit 406 supplies electric power to the electronic instrument main body circuit 407, and continues to supply electric power to the electronic instrument main body circuit 407 until the voltage Va of the capacitor 405 is decreased down to a voltage not higher than the predetermined voltage value Vt. When the voltage Va of the capacitor 405 becomes a value not higher than the predetermined voltage value Vt, the control circuit reaches a cutoff point and does not send electric power to the electronic instrument main body circuit 407. When the connection between the capacitor 405 and the electronic instrument main body circuit 407 is once cut off, if the voltage Va of the capacitor 405 does not become the predetermined voltage value Vt or more once again, the control circuit does not send electric power to the electronic instrument main body circuit 407.

Next, the control circuit 406, which is a distinctive structure of this embodiment, will be described in detail. This control circuit 406 monitors the voltage Va of the capacitor 405, and if the voltage is increased up to a value not lower than the predetermined voltage value Vt, the control circuit supplies electric power to the electronic instrument main body circuit 407. Although this predetermined voltage Vt is set at a value not less than the minimum operation voltage of the electronic instrument main body circuit 407, the relation is set so as to satisfy the following relation:

Minimum operation voltage≦Vt*capacitance of the capacitor/(capacitance of the capacitor+whole capacitance of the electronic instrument main body circuit as seen from the power source input terminal).

On the contrary, if the predetermined voltage value Vt is set at an excessively high value, it takes an excessively long time until the voltage of the capacitor 405 is increased, and it takes an excessively long time from the start of power supply of the power source circuit 401 to the start of operation of the electronic instrument main body circuit 407.

Figure 5:
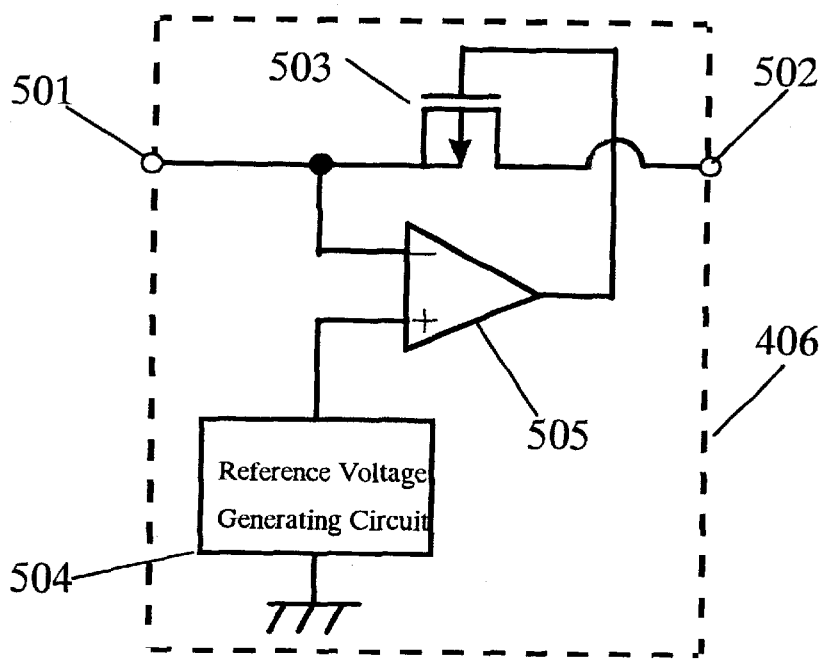
FIG. 5 is a circuit diagram of a control circuit used in the embodiment of FIG. 4.

Although a variety of structures can be conceivable as the structure of the control circuit 406, one embodiment is shown in FIG. 5. The control circuit 406 realizes a switching operation at the predetermined voltage value Vt by using a P-type MOS transistor 503, a comparator circuit 505, and a reference voltage generating circuit 504.

A source (S) of the P-type MOS transistor 503 is connected to an input terminal 501 of the control circuit 406, and a drain (D) is connected to an output terminal 502. A reference voltage output from the reference voltage generating circuit 504 is set at the predetermined voltage value Vt here, and the absolute value of a threshold voltage of the P-type MOS transistor 503 is set at an arbitrary value not higher than the predetermined voltage value Vt.

The output voltage of the reference voltage generating circuit 504 is input to a positive or non-inverting terminal of the comparator circuit 505, and a negative terminal thereof is connected to the input terminal 501 of the control circuit 406. The output voltage of the comparator circuit 505 is connected to a gate (G) of the P-type MOS transistor 503. Here, the comparator circuit 505 has a hysteresis, and this hysteresis ΔV is set as follows:

ΔV=predetermined voltage value Vt−minimum operation voltage of the electronic instrument main body circuit 407.

Because of such a structure, the comparator circuit 505 compares the potential at the input terminal 501 of the control circuit 406 with the output potential of the reference voltage generating circuit 504, and when the potential at the input terminal 501 of the control circuit 406 exceeds the output voltage of the reference voltage generating circuit 504, the comparator circuit 505 outputs a signal to turn on the P-type MOS transistor 503, so that electric power is sent from the input terminal 501 of the control circuit 406 to the output terminal 502, and the electronic instrument main body circuit 407 starts to operate.

Although the control circuit sends the electric power to the electronic instrument main body circuit 407 in the case where the electric power has been sent without change, when the potential at the side of the input terminal of the control circuit 406 is decreased down to an off detection voltage (predetermined voltage value Vt−hysteresis ΔV) of the comparator circuit 505, the comparator outputs a signal to turn off the P-type MOS transistor 503, so that the connection between the capacitor 405 and the electronic instrument main body circuit 407 is cut off.

Here, since the P-type MOS transistor 503 is used, the signal to turn on the transistor is a GND potential, and the signal to turn off the transistor is a potential of power source voltage of the control circuit 406. Like this, the control circuit 406 makes switching by using the P-type MOS transistor 503, the comparator circuit 505, and the reference voltage generating circuit 504, so that the predetermined voltage value Vt can be freely set, and after the power source circuit 401 starts to supply electric power, the electronic instrument main body circuit 407 can start to operate quickly.

Figure 6:
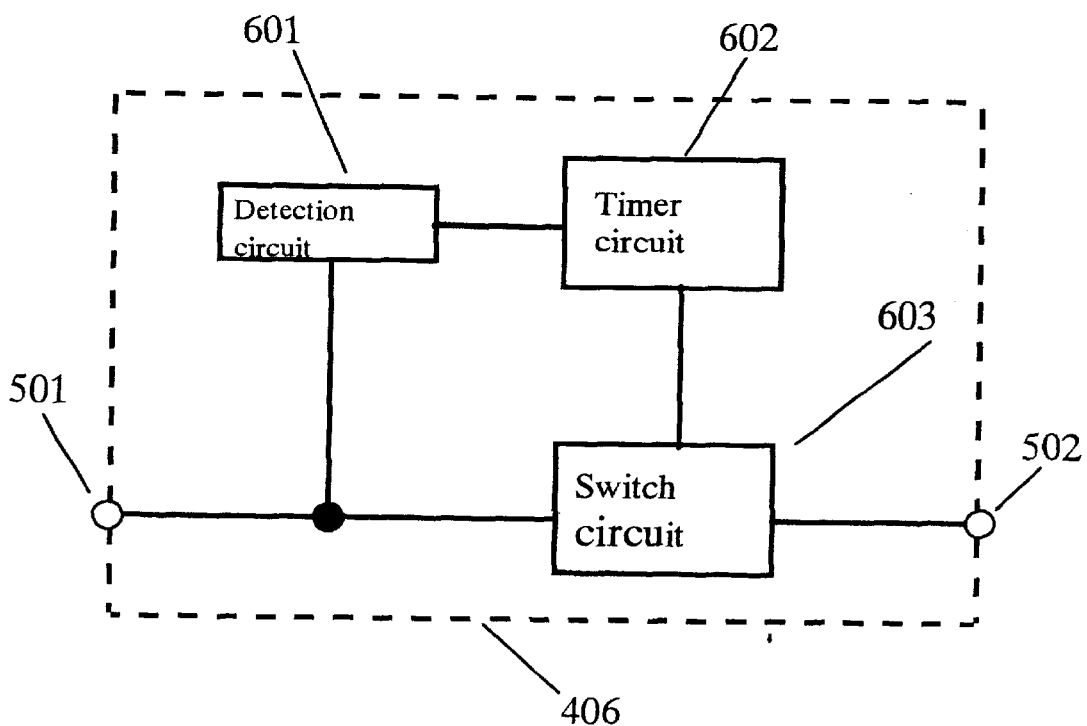
FIG. 6 is circuit diagram of another control circuit used in the embodiment of FIG. 4.

FIG. 6 shows a control circuit 406 according to another embodiment. The control circuit 406 of FIG. 5 detects a voltage at the input terminal 501 to cut off the connection between the input terminal 501 of the control circuit 406 and the output terminal 502. On the other hand, in the control circuit 406 shown in FIG. 6, a timer circuit 602 is provided so that the on/off control is made with an elapsed time from the start of transmission of electric power from the input terminal 501 of the control circuit 406 to the output terminal 502.

As shown in FIG. 6, the control circuit 406 is made up of a detection circuit 601, a timer circuit 602, and a switch circuit 603, and the detection circuit 601 detects a voltage at the input terminal 501 of the control circuit 406 and outputs a detection signal to the timer circuit 602. On the basis of the detection signal from the detection circuit 601, the timer circuit 602 sends a control signal to the switch circuit 603, and at the same time, counts a predetermined time. The input of the switch circuit 603 is connected to the input terminal 501 of the control circuit 406, the output thereof is connected to the output terminal 502 of the control circuit 406, and the control signal is supplied from the timer circuit 602. In response to this control signal, the switch circuit connects the input terminal 501 with the output terminal 502 or cut off the connection between them.

By such a structure, when the voltage of the input terminal of the control circuit 406 is increased up to a value not lower than the predetermined voltage Vt, the detection circuit 601 detects the voltage, and sends a detection signal to the timer circuit 602. The timer circuit 602 having received the detection signal starts to count a predetermined time, and at the same time, the timer circuit 602 sends a control signal to the switch circuit 603 to connect the input terminal 501 of the control circuit 406 with the output terminal 502. The control signal continues to make connection between the input terminal 501 and the output terminal 502 for at least the predetermined time by the timer.

When the timer circuit 602 finishes the count of the predetermined time, if the voltage at the input terminal 501 of the control circuit 406 is not less than the predetermined voltage value Vt, the timer circuit 602 again counts the predetermined time, and sends a control signal to connect the input terminal 501 of the switch circuit 603 with the output terminal 502. On the contrary, when the voltage at the input terminal 501 is not higher than the predetermined voltage value Vt, the timer circuit 602 sends a control signal to the switch circuit 603 to cut off the connection between the input terminal 501 and the output terminal 502.

Like this, in the control circuit 406 of FIG. 6, the connection between the input terminal 501 and the output terminal 502 is controlled by using the timer circuit 602. Thus, it is possible to prevent erroneous detection of the detection circuit 501 due to voltage drop of the input terminal voltage immediately after the connection of the input terminal 501 with the output terminal 502, and the electronic instrument main body circuit 407 can start to operate rapidly after the power source circuit 401 starts to supply electric power.

Figure 7:
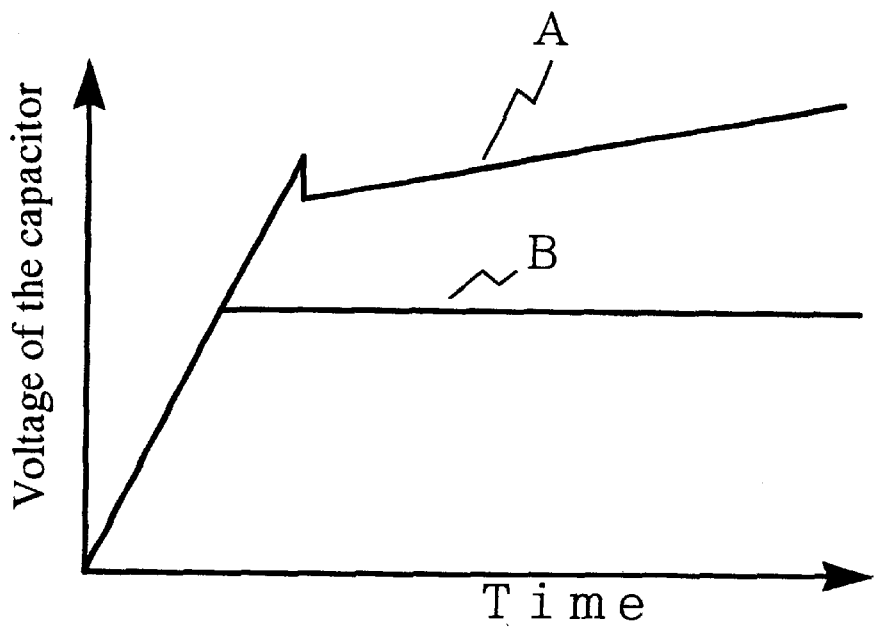
FIG. 7 is a graph showing capacitor voltages of the embodiment of FIG. 4 and the related art.
Figure 9:
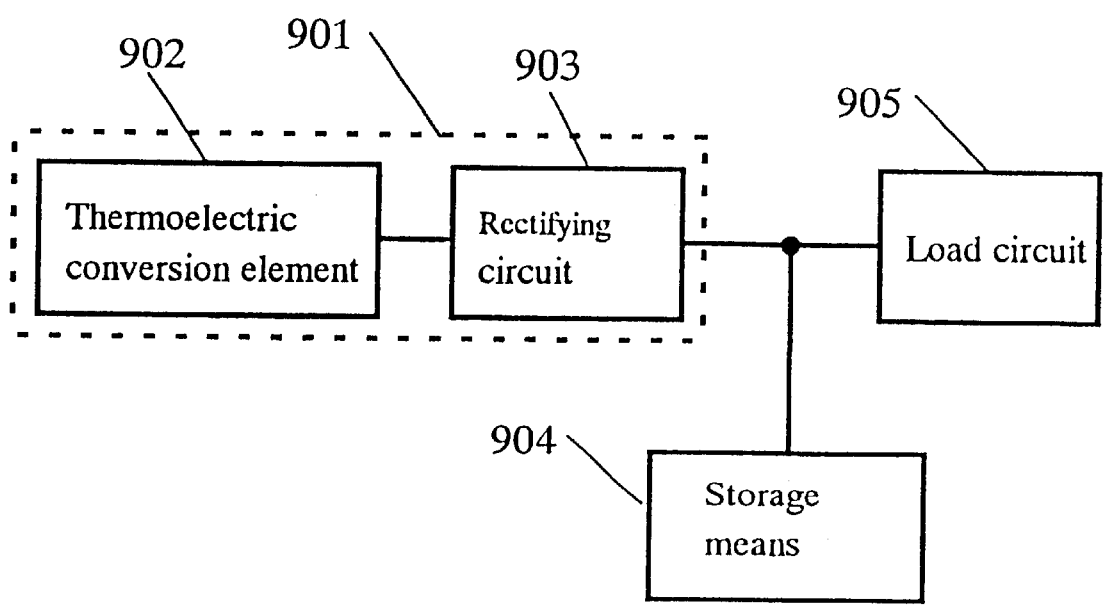
FIG. 9 is a block diagram of a conventional electronic instrument.

FIG. 7 is a graph showing voltage change (A in FIG. 7) of the capacitor 405 with respect to time from a point when the power source circuit 401 of this embodiment starts to supply electric power, and voltage change (B in FIG. 7) of the storage means 904 (in the case where a capacitor similar to that of FIG. 4 is used as the storage means) with respect to a time in the related art of FIG. 9. As is understood from this graph, in the electronic instrument of the related art of FIG. 9, by the erroneous operation of the load circuit 905 at a voltage not higher than the minimum operation voltage, the voltage of the storage means 904 hardly comes to vary. Since this voltage value is not higher than the minimum operation voltage of the load circuit 905, it takes a rather long time until the load circuit 903 operates, or the operation becomes impossible.

On the contrary, in this embodiment, the voltage of the capacitor 405 is supplied to the electronic instrument main body circuit 407 after it is sufficiently increased. Thus, the increasing speed of the power source voltage is faster than the related art, and a period of time from the start of power supply of the power source circuit 401 to the start of operation of the electronic instrument main body circuit 407 becomes short.

Next, the operation will be described. As shown in FIG. 4, the electric power generated by the thermoelectric conversion element 402 is boosted by the boosting circuit 403. The boosted electric power is supplied to the capacitor 405 through the Schottky diode 404.

The control circuit 406 is connected between the capacitor 405 and the electronic instrument main body circuit 407. The control circuit 406 cuts off the connection between the capacitor 405 and the electronic instrument main body circuit 407 and does not send the electric power until the input voltage of the control circuit 406 becomes the predetermined voltage value Vt or more. Thus, voltage is increased until the voltage of the capacitor 405 reaches the predetermined voltage value Vt.

In the case where the input voltage of the control circuit 406 exceeds the predetermined voltage value Vt, the control circuit 406 connects the capacitor 405 with the electronic instrument main body circuit 407, and sends the electric power of the capacitor 405 to the electronic instrument main body circuit 407. At this time, as shown by A in FIG. 7, the voltage value Va of the capacitor 405 is dropped at the instant of connection. However, the dropped voltage is set at a value not lower than the minimum operation voltage of the electronic instrument main body circuit 407, so that the electronic instrument main body circuit starts to operate. Thus, it is possible to shorten a period of time from the start of feeding of the power source circuit 401 to the start of operation of the electronic instrument main body circuit 407. As is understood from FIG. 7, in the case of this embodiment indicated by A, as compared with the related art indicated by B, an electronic instrument driving time is greatly improved.

In the above description, although the timer circuit 602 controls the switch circuit 603 to turn it on for a certain time, even in the case where the timer circuit 602 turns off the switch circuit for a certain time, an erroneous operation can be reduced. That is, when the input voltage of the control circuit 406 is lowered and becomes a value not higher than the predetermined voltage value Vt, the switch circuit 603 is continuously turned off for a certain time determined by the timer circuit 602. The input voltage is again checked after the elapse of a period of time in which the input voltage of the control circuit 406 can be restored, and based on the result, the switch circuit 603 is controlled. By this, even if the detection circuit 601 is made not to have a hysteresis, it is possible to avoid such a case that the switch circuit 603 is frequently turned on and off so that the input voltage of the control circuit 406 is not increased.

Figure 8:
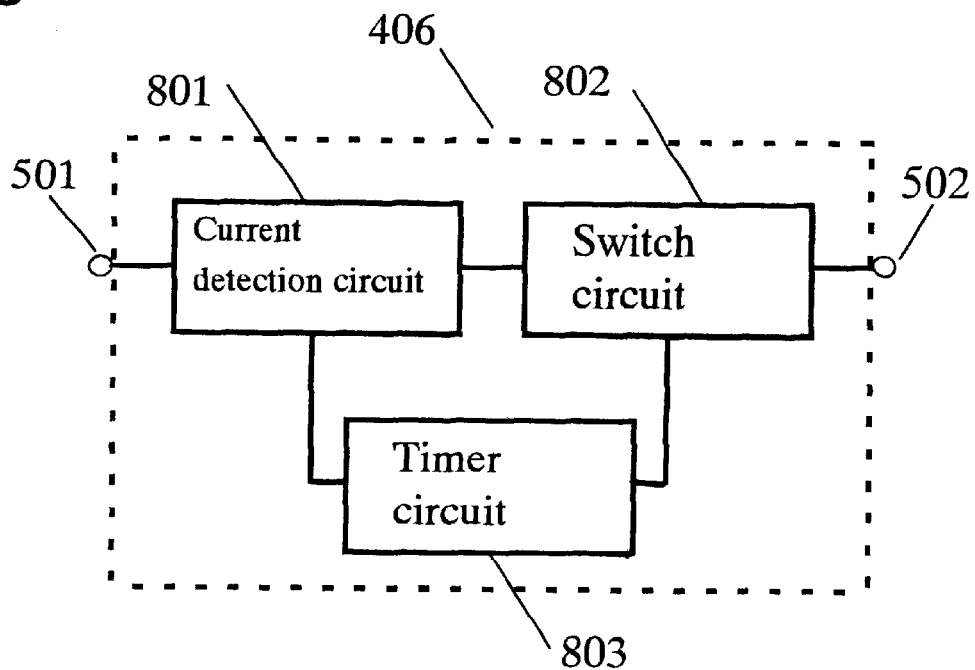
FIG. 8 is a circuit diagram of a still another control circuit used in the embodiment of FIG. 4.

FIG. 8 is a block diagram showing a control circuit 406 according to still another embodiment. Electric power supplied from the power source circuit 401 to the input terminal 501 of the control circuit 406 is transmitted to a switch circuit 802 through a current detection circuit 801. When an excessive current is detected, a detection signal is sent to a timer circuit 803, an off signal with a certain time is sent to a switch circuit 802, power supply to the output terminal 502 is cut off, and the electronic instrument main body circuit 407 connected to the output terminal 502 stops the operation.

The current detection circuit 801 is constructed such that a relatively small resistor is inserted in series to a path where current flows, a voltage difference across the resistor is measured, an on signal is sent to the timer circuit 803 when the voltage difference is not higher than a reference value, and an off signal is sent to the timer circuit 803 when the voltage difference is not less than the reference value. Alternatively, it is also possible to construct such that a MOS transistor, which is feedback controlled so that its voltage drop becomes a certain value of a relatively small value, is inserted in the path where current flows, a current in proportion to the MOS transistor current is taken with current mirror, and this current is flown to a suitable load so that current detection is made. Here, the current detection point may be placed even before the capacitor 405, or it is also possible to more certainly prevent an erroneous operation by combining the current detection and the input voltage detection of the control circuit 406.

Incidentally, with respect to the foregoing control circuit 406, although the description has been made on the example in which the P-type MOS transistor is used, it is needless to say that the same structure as the above may be constructed by using an N-type MOS transistor of opposite conductivity. The comparator circuit has an effect of decreasing an erroneous operation even if a hysteresis is not provided, and if the hysteresis is given to the comparator circuit, it is possible to further increase the effect of preventing the erroneous operation.

Moreover, in the foregoing description, although the thermoelectric conversion element is used as the electric power generating means in the power source circuit, a solar panel (solar cell plate), a mechanical electric converter, and others may be used.

Moreover, in the foregoing embodiments, the description has been made on the examples in which generated voltage of the thermoelectric conversion element is boosted. However, in the case where generated voltage of the electric power generating means is higher than necessity, the boosting circuit may not be provided or the voltage may be lowered by a voltage lowering circuit. The magnification of voltage conversion in this case becomes less than 1.

Moreover, in the above description, the rectifying circuit or countercurrent preventing diode is used. However, since wasteful power consumption due to countercurrent can be suppressed through the boosting circuit itself by, for example, stopping the clock of the boosting circuit, the rectifying circuit or countercurrent preventing diode is not necessarily an indispensable element.

Moreover, in the embodiments of the present invention, although the case of the electric watch has been described, the present invention can also be applied to other electronic instruments such as portable communication instruments or electric home appliances.

According to the present invention, even in such an electronic instrument that power source voltage is not quickly raised, the operation of an electronic instrument main body circuit is not started at a halfway power source voltage so that a through current does not flow. Alternatively, a voltage capable of causing a normal operation is supplied at one stroke so as not to apply a halfway power source voltage to the electronic instrument main body circuit. Thus, a through current does not flow, and when the power source circuit starts to supply electric power, the electronic instrument main body circuit can start to operate rapidly. Since the power loss due to the through current can be decreased, an electronic instrument having a high power efficiency can be obtained. Especially, the present invention is effective in an electronic instrument having a long period of time in which an electronic instrument main body circuit remains in the vicinity of an operation voltage at which the operation of the electronic instrument main body circuit is unstable.

Moreover, in an electronic instrument including electric power generating means and storage means, it becomes possible to use a small electric power generating means and a large capacity storage means, so that it is possible to provide an electronic instrument, such as an electric watch, which is small, lightweight, and can be operated for a long time.

Further, in the case where an electronic instrument main body circuit includes an electric element having high driving capability, it is possible to prevent a fatal erroneous operation that the electric element is turned on by an erroneous operation, so that the power source voltage of the electronic instrument main body circuit is not increased, and the operation becomes impossible.

Moreover, in the case where the thermoelectric conversion element having a low generation voltage is used as the electric power generating means and the voltage is used after it is boosted by a boosting circuit, even if a charging current is lowered by the use of the boosting circuit and the rising of the power source voltage becomes gentle, it becomes possible to effectively prevent an erroneous operation.

Incidentally, in the case where a clock system of an electronic instrument includes a motor driving electric element to a power source, the electric element is made to be in an off state by a control signal until a feeding voltage from a power source circuit becomes a voltage at which an electronic instrument main body circuit normally operates, so that it is possible to prevent a problem that the power source voltage is not increased and the operation becomes impossible.

Further, in an electronic instrument of the present invention, after the input voltage of a control circuit is detected, electric power is continuously supplied to an electronic instrument main body circuit for a certain time by a timer circuit, so that it is possible to prevent such a case that power source voltage is abruptly lowered by a consumed current of the electronic instrument main body circuit so that erroneous detection occurs.

What is claimed is:

1. An electric instrument comprising: a main circuit for performing a given function and having a minimum operation voltage at or above which stable operation may be achieved and below which unstable operation may be achieved; a control circuit for producing a control signal and having a minimum operation voltage at or above which stable operation may be achieved, the minimum operation voltage of the control circuit being lower than the minimum operation voltage of the main circuit; and a power source for supplying a power source voltage to the main circuit and the control circuit; wherein the control circuit receives the power source voltage and outputs the control signal for stopping operation of the main circuit when the operation voltage is at a level between the minimum operation voltage level of the control circuit and the minimum operation voltage level of the main circuit, and for outputting the control signal for enabling operation of the main circuit when the operation voltage reaches the minimum operation voltage level of the main circuit.

2. An electronic instrument according to claim 1; wherein the control circuit comprises a detection circuit for detecting an input voltage of the control circuit and producing a detection signal in accordance therewith, a timer circuit for inputting the detection signal output by the detection circuit and outputting the control signal in accordance therewith after counting for a predetermined delay time, and a switch circuit for receiving the control signal output by the timer circuit and selectively connecting the power source to the main circuit in accordance therewith so that the power source is disconnected from the main circuit the predetermined time after the detection circuit detects that the input voltage of the control circuit is lower than the minimum operating voltage of the main circuit.

3. An electronic instrument according to claim 1; wherein the main circuit comprises a clock system for performing a timekeeping function.

4. An electronic instrument according to claim 3; wherein the clock system comprises an oscillator, a frequency-dividing circuit for frequency dividing an output signal of the oscillator, and display means for displaying time, and wherein the control circuit resets the frequency-dividing circuit of the clock system.

5. An electronic instrument according to claim 1; wherein the main circuit includes a switching element and the control circuit outputs the control signal for maintaining the switching element in an off state when the supply voltage output by the power source is not at least the minimum operation voltage of the main circuit to prevent the switching element from allowing a current to pass therethrough when the main circuit is disabled by the control circuit.

6. An electronic instrument according to claim 5; wherein the main circuit includes a motor, and the switching element is a MOS transistor used for driving the motor.

7. An electronic instrument according to claim 1; further comprising storage means disposed at an output side of the power source, wherein the control circuit includes a detection circuit for monitoring an output voltage of the power source, and a switch circuit for selectively supplying electric power from the storage means to the main circuit, and wherein the power supply to the main circuit is cut off when a voltage of the storage means is not higher than a prescribed voltage value near the minimum operation voltage of the main circuit.

8. An electronic instrument according to claim 7; wherein the control circuit comprises a reference voltage generating circuit for generating a reference voltage equal to the prescribed voltage value, and a comparison circuit for comparing the reference voltage with an input voltage of the control circuit, and a MOS transistor, wherein an output signal of the comparison circuit is connected to a gate of the MOS transistor, and a source and a drain of the MOS transistor are respectively connected to an input terminal and an output terminal of the control circuit.

9. An electronic instrument according to claim 1; wherein a threshold value of transistors used in the control circuit is made lower than that of transistors used in the main circuit.

10. An electronic instrument according to claim 1; wherein the power source comprises electric power generating means for generating electric power, and storage means for storing the electric power generated by the electric power generating means.

11. An electronic instrument according to claim 10; wherein the electric power generating means is a thermoelectric conversion element.

12. An electronic instrument according to claim 10; further comprising a boosting circuit for boosting an output voltage of the electric power generating means to charge the storage means.

13. An electronic instrument according to claim 1; wherein the main circuit comprises a clock circuit including an oscillator, a frequency-dividing circuit for frequency dividing an output signal of the oscillator and producing a frequency-divided output signal, time counting means for counting time based on the frequency-divided output signal, and display means for displaying time; wherein the control signal is supplied as a reset signal to at least one of the frequency-dividing circuit, the time counting means and the display means.

14. An electronic instrument according to claim 13; wherein the display means includes a display driven by a stepper motor and a motor driving transistor for driving the motor; wherein the control signal is supplied as an input to the motor driving transistor so that current is not consumed thereby when the supply voltage is lower than the minimum operating voltage of the main circuit.

15. An electronic instrument according to claim 13; wherein the power source includes a thermoelectric conversion device for producing an output voltage in response to a temperature difference thereacross.

16. An electronic instrument according to claim 15; wherein the thermoelectric conversion device comprises a plurality of N-type and P-type thermoelectric material elements connected in series between a pair of opposing substrates.

17. An electronic instrument according to claim 15; wherein the power source further comprises a boosting circuit for boosting the output voltage of the thermoelectric conversion device.

18. An electronic instrument according to claim 17; further comprising a capacitor to be charged by the output of the boosting circuit.

19. An electronic instrument according to claim 18; wherein the capacitance value of the capacitor is at least twice the capacitance value of the main circuit as seen from a power source input terminal thereof.

20. An electric instrument comprising: a main circuit for performing a given function and having a minimum operation voltage at which the main circuit can perform the function in a stable manner, the main circuit including a switching element having a large driving capability; a power source for producing electric power; a storage device for storing electric power output by the power source and supplying stored electric power to the main circuit; and a control circuit for maintaining the switching element in an off state until the stored electric power reaches the minimum operation voltage of the main circuit to prevent a through current in the switching element from preventing the stored electric power from increasing in voltage level.

21. An electronic instrument comprising: a main circuit for performing a given function and having an electronic element serving as a current drain so that a power source voltage applied to the main circuit is not increased if the electronic element is turned on when the power source voltage is lower than a minimum operation voltage at which the main circuit performs the given function in a stable manner; electric power generating means for generating electric power; storage means for storing the electric power output by the electric power generating means and supplying stored power to the electronic element; a control circuit for supplying the stored power to the electronic element only when a voltage of the stored power is higher than a first predetermined voltage which is higher than the minimum operation voltage of the electronic element, and for preventing the stored power from being supplied to the electronic element when a voltage of the stored power is lower than a second predetermined voltage which is lower than the first predetermined voltage and higher than the minimum operation voltage of the electronic element.

22. An electronic instrument comprising: a main circuit for performing a given function and having an electronic element serving as a current drain so that a power source voltage applied to the main circuit is not increased if the electronic element is turned on when the power source voltage is lower than a minimum operation voltage at which the main circuit performs the given function in a stable manner; electric power generating means for generating electric power; storage means for storing the electric power output by the electric power generating means and for supplying a stored power to the electronic element; a control circuit supplying the stored power to the electronic element during a predetermined time from the moment a voltage of the stored power reaches a predetermined voltage value which is higher than a minimum operation voltage of the electronic element, and, after the predetermined time, continuing to supply the stored power to the electronic element only if the voltage of the stored power is higher than the predetermined voltage.

* * * * *